(12) United States Patent　(10) Patent No.: US 11,058,225 B2
Nuss et al.　(45) Date of Patent: Jul. 13, 2021

(54) ARMREST

(71) Applicant: GRAMMER AG, Amberg (DE)

(72) Inventors: Ralph Nuss, Poppenricht (DE); Gerhard Delling, Schmidgaden (DE)

(73) Assignee: GRAMMER AG, Ursensollen (DE)

( * ) Notice: Subject to any disclaimer, the term of this patent is extended or adjusted under 35 U.S.C. 154(b) by 0 days.

(21) Appl. No.: 16/129,018

(22) Filed: Sep. 12, 2018

(65) Prior Publication Data

US 2019/0082851 A1　Mar. 21, 2019

(30) Foreign Application Priority Data

Sep. 13, 2017　(DE) .......................... 102017121255.8

(51) Int. Cl.
*A47C 7/54* (2006.01)
*B60N 2/75* (2018.01)

(52) U.S. Cl.
CPC .............. *A47C 7/541* (2018.08); *B60N 2/753* (2018.02); *B60N 2/773* (2018.02); *B60N 2205/20* (2013.01)

(58) Field of Classification Search
CPC ........ A47C 7/541; B60N 2/753; B60N 2/773; B60N 2205/20
USPC ........................................ 297/411.35, 411.37
See application file for complete search history.

(56) References Cited

U.S. PATENT DOCUMENTS

| | | | | | |
|---|---|---|---|---|---|
| 5,281,001 | A * | 1/1994 | Bergsten | ............ | A47B 21/0371 297/411.35 X |
| 5,369,805 | A * | 12/1994 | Bergsten | ............ | A47B 21/0371 297/411.35 X |
| 5,597,207 | A * | 1/1997 | Bergsten | ............ | A47B 21/0371 297/411.35 X |
| 5,851,054 | A * | 12/1998 | Bergsten | ............ | A47B 21/0371 297/411.35 |
| 5,884,974 | A * | 3/1999 | Bergsten | ............ | A47B 21/0371 297/411.35 |
| 6,022,079 | A * | 2/2000 | Bergsten | ............ | A47B 21/0371 297/411.35 |
| 6,142,570 | A * | 11/2000 | Bergsten | ............ | A47B 21/0371 297/411.35 X |
| 6,203,109 | B1 * | 3/2001 | Bergsten | ............ | A47B 21/0371 297/411.35 |
| 6,419,314 | B1 * | 7/2002 | Scheerhorn | ............... | B60R 7/04 297/188.19 |
| 7,077,468 | B2 * | 7/2006 | Maierholzner | ........ | B60N 2/773 297/411.35 X |
| 7,837,269 | B2 * | 11/2010 | Bock | ........................ | A47C 1/03 297/411.35 |

(Continued)

FOREIGN PATENT DOCUMENTS

DE　10126536 A1　12/2002
DE　102007013081 A　9/2008

*Primary Examiner* — Rodney B White

(74) *Attorney, Agent, or Firm* — Andrew Wilford

(57) ABSTRACT

An armrest has a base element, an arm-support element movable in a direction on the base element between a pair of end positions, a mount fixed on one of the elements and formed with a throughgoing hole extending in the direction, and a rod fixed on the other of the elements and extending along an axis with play through the hole of the mount. A pair of inelastic slide-bearing rings fixed in the hole at ends thereof loosely surrounds the rod. A respective elastic bearing block fixed in and relative to each of the rings presses the rod radially against a diametrally opposite inner-surface portion of the respective ring.

6 Claims, 7 Drawing Sheets

(56) References Cited

U.S. PATENT DOCUMENTS

Figure 1:
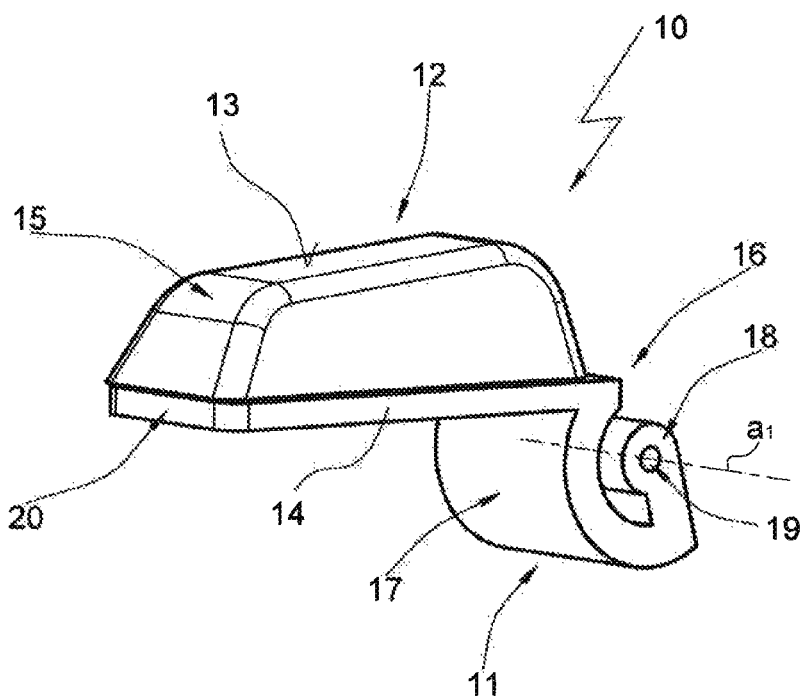

| | | | |
|---|---|---|---|
| 8,162,369 B2* | 4/2012 | Tsuda | B60R 7/04 |
| | | | 296/24.34 |
| 8,201,901 B2* | 6/2012 | Craddock | B60N 2/773 |
| | | | 312/334.11 |
| 10,219,629 B2* | 3/2019 | Serena | A47C 1/03 |
| 2004/0108740 A1 | 6/2004 | Maierholzner | |
| 2007/0262632 A1* | 11/2007 | Cody | B60N 2/793 |
| | | | 297/411.35 |
| 2009/0066103 A1* | 3/2009 | Koarai | B60R 7/04 |
| | | | 296/24.34 |
| 2011/0169288 A1 | 7/2011 | Schreurs et al. | |
| 2012/0049601 A1* | 3/2012 | von Rothkirch und Panthen | F16C 29/123 |
| | | | 297/411.2 |
| 2015/0298588 A1 | 10/2015 | Lorey | |
| 2017/0175811 A1 | 6/2017 | Zimmermann | |
| 2018/0304790 A1* | 10/2018 | Patil | B60N 2/773 |

\* cited by examiner

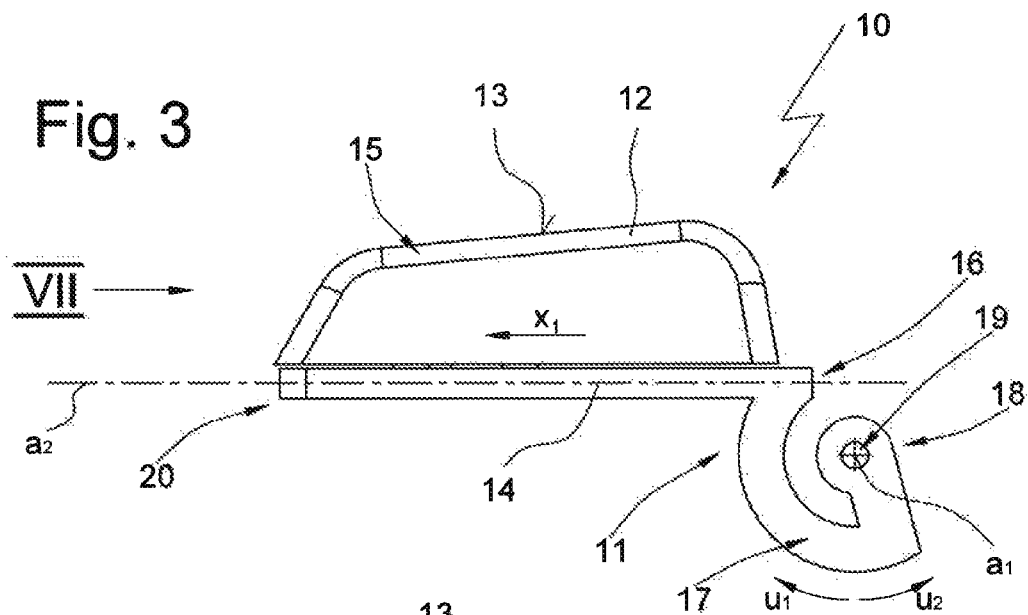
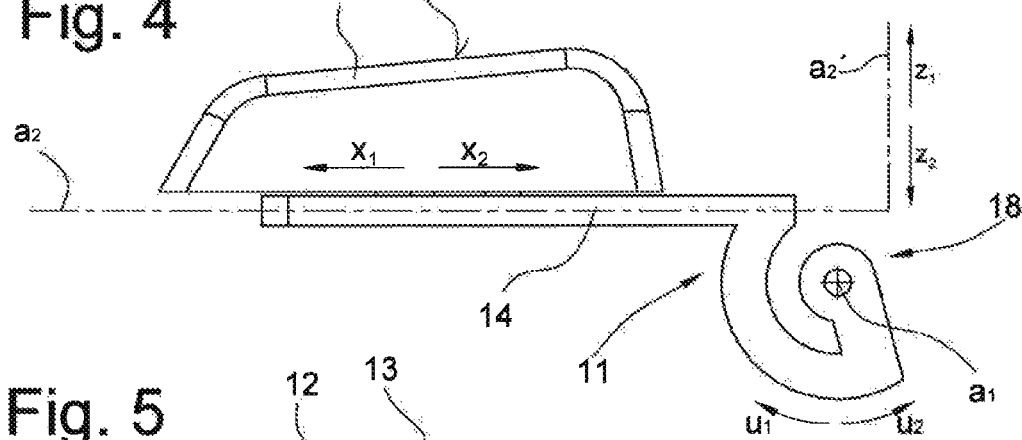
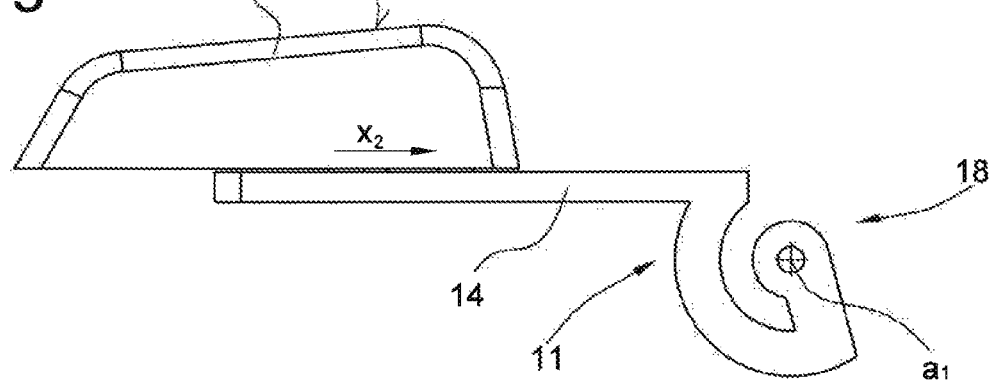

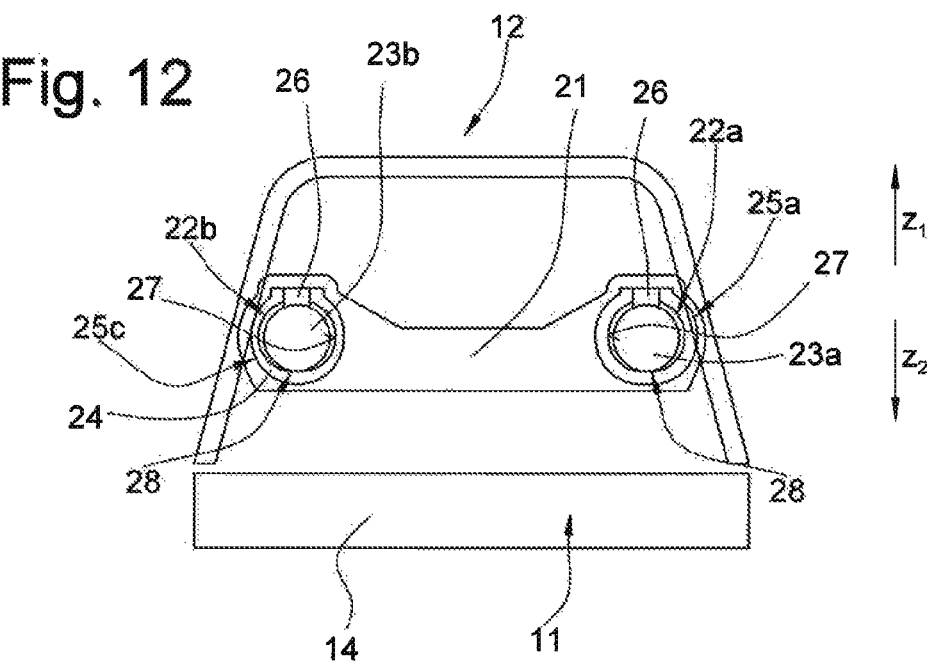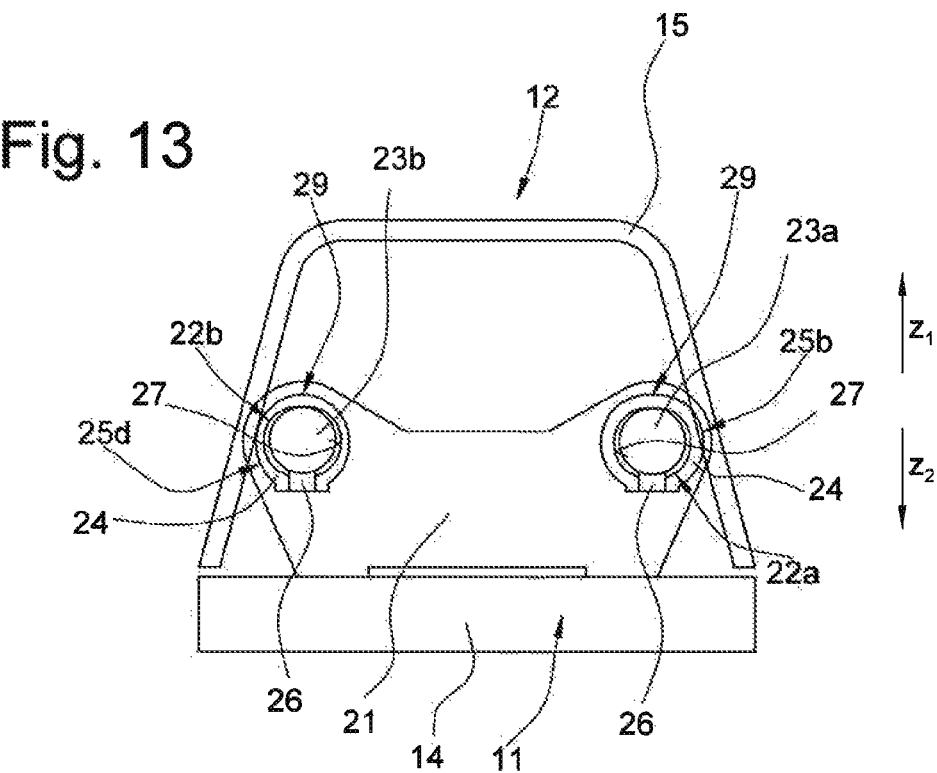

ARMREST

The invention relates to an armrest.

Such an armrest is known, for example, from DE 10 2007 013 081. An arm support of the armrest is movably guided on guide tubes between a first position and a second position. In this way, the position of the arm support can be adjusted according to the needs of the seat occupant.

In such armrests from the prior art, it was customary to guide each guide tube in two slide bearings each formed from elastically deformable plastic rings, in particular, for example, from rings of the material Cellasto® from BASF. Due to their elastic deformability, these rings yielded under load until the guide tube came into contact with the rigid mount in which the ring was carried. The displacement of the arm support due to the elastic deformation of the ring was perceived by the user as considerable play. In the end positions, this play can be eliminated by angled ramps. In intermediate positions, this is, in particular if the armrest is not locked, not possible and therefore particularly bothersome for the user.

It is an object of the invention to provide an armrest with an arm support displaceable between a first position and a second position and also is approximately free of play under load.

This object is attained by an armrest having the features of claim 1.

The armrest comprises a base and an arm support displaceable relative to the base between a first end position and a second end position in opposite displacement directions along a path of travel. In this case, the arm support is movable through intermediate positions between the first position and the second position. The arm support is displaceable linearly along the movement path. The movement path may be straight or curved or at least have one straight and at least one curved section.

The armrest has a guide assembly having a first guide on the base and a second guide on the arm support. The first guide is, for example, fastened directly or indirectly to the base or integrally formed therewith. The second guide is, for example, fastened to the arm support directly or indirectly or integrally formed therewith. The first guide and the second guide form cooperating guide surfaces that are movable relative to each other. The guides limit movement of the arm support in at least one direction extending at a right angle to the displacement direction.

Play is formed between the guides. When a force F acts on the arm support, guide surfaces of the first and second guides are in contact. The guide assembly has an elastic bumper block that holds the first guide in contact with the second guide, even when the arm support is unloaded. For purposes of the invention, contact is not understood to mean exclusively direct contact, but also an indirect stop of the cooperating guides.

The elastic bumper block urges the first guide or the second guide in a first loading direction relative to the respective other of the guides such that it corresponds to the relative position of the first guide to the second guide at a defined load. For the arm support, this is, for example, a loading situation in which the arm support is pushed downward because a seat occupant is supported on it. In other words, the elastic bumper block urges the cooperating guides into a relative position as would be set due to the support load imposed by a seat occupant. In the actual load case, no relative movement of the arm support to the base then occurs in this load direction.

When there is a load in a second loading direction that is directed opposite to the first loading direction, such as when pivoting the arm support from a position in which a longitudinal center axis is approximately horizontally aligned into an approximately vertical orientation, the play is less disturbing since the arm support is damped by the elastic bumper block. In addition, the load is usually lower, so that the elastic bumper block also prevents or dampens play. The play with such a load can also be influenced by the elastic bumper block being designed stiffer or less stiff.

The elastic bumper block may, for example, itself be elastically deformable or it may be provided, for example, by a spring. The elastic bumper block may be formed, for example, from a plastic, for example, from plastic foam.

The cooperating guide surfaces are formed substantially non-deformable. The guide surfaces are formed, for example, from a rigid plastic, a metal or a composite material. Non-deformable in the context of the invention means that the guide surfaces do not deform or only insignificantly deform during a normally occurring load.

The first guide and/or the second guide comprise at least one bearing that can be fastened directly or indirectly to the base or to the arm support. The bearing limits the movement of the arm support in at least one direction at a right angle to the displacement direction. The bearing may, for example, limit the movement of the arm support in two spatial directions directed at right angles to the displacement direction.

The bearing is formed, for example, substantially non-deformable. The bearing is formed, for example, from a rigid plastic or a metal. The bearing may be a slide bearing, a ball bearing or a roller bearing.

The elastic bumper block is on the bearing, for example. It may, for example, be fastened to the bearing. The bearing can be mounted in this way together with the elastic bumper block in a simple manner according to the loading position of the cooperating guides.

The bearing is formed for example, as a ring. The ring encloses, for example, a rod of the guides at least partially. In other words, the ring need not be closed, it may be an open ring that partially surrounds the rod. The ring may also completely enclose the rod according to an alternative embodiment.

For example, the first guide or the second guide has at least one pair of spaced bearings. For example, if the arm support is loaded outside the spacing between the two bearings, a tilting moment may occur around one of the two bearings. Each of the two bearings is then loaded in opposite directions.

The cooperating guides comprise, for example, a rod that forms a guide having at least one mount. The rod is, for example, guided on the mount or the mount is guided on the rod. The rod is displaceable linearly relative to the mount. The rod may, for example, be formed of plastic, a metal or a composite material.

The rod is, for example, on the arm support and the mount is on the base. According to an alternative, the rod is associated, for example, with the base and the mount with the arm support. The rod is fastened, for example, to the arm support or to the base or integrally formed therewith. The mount is fastened, for example, to the base or to the arm support or integrally formed therewith.

The guide assembly has, for example, two rods. The rods work together, for example, with at least one mount. The rods are, for example, parallel to each other. A longitudinal axis of the rods is directed, for example, in the displacement direction. Each rod works together, for example, with at least one bearing.

Each bearing can be in a separate mount. Alternatively, for example, two bearings that work together with a rod are arranged in a mount. According to a further alternative, for example, each rod is guided in two bearings, wherein four bearings are arranged in a mount. The mount may be on the base or the arm support.

The rod is, for example, cylindrical, in particular circularly cylindrical and the mount is complementarily shaped. This allows for easy manufacture and ensures jam-free guidance.

For example, the arm support is pivotable about a pivot axis between a primary position and a secondary position. For example, the primary position is an approximately horizontal use position and the secondary position is an approximately vertical non-use position.

Figure 2:
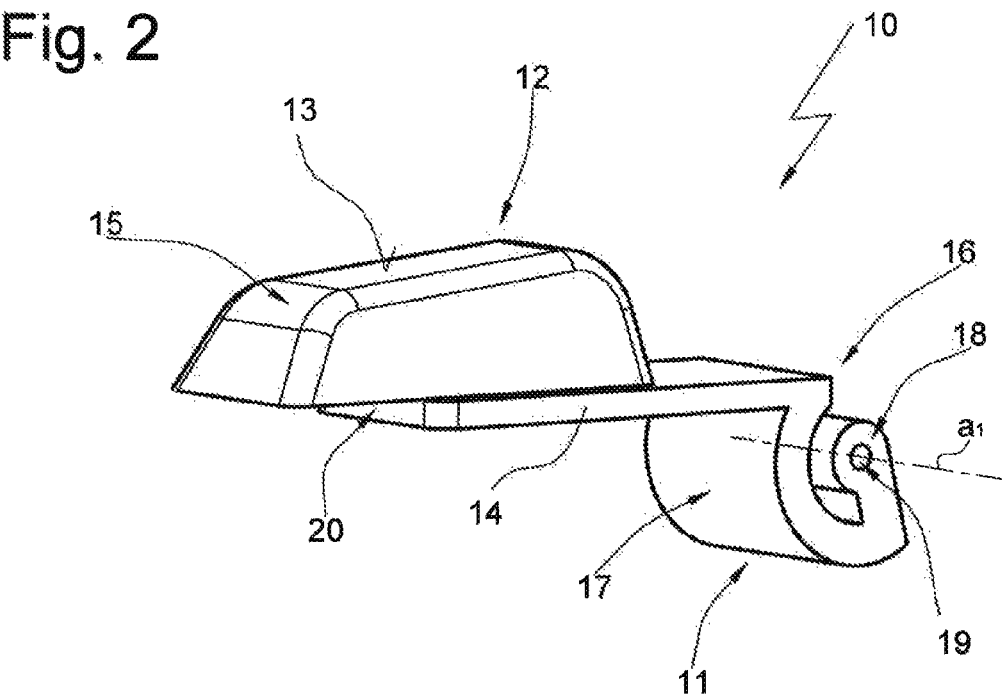
Figure 6:
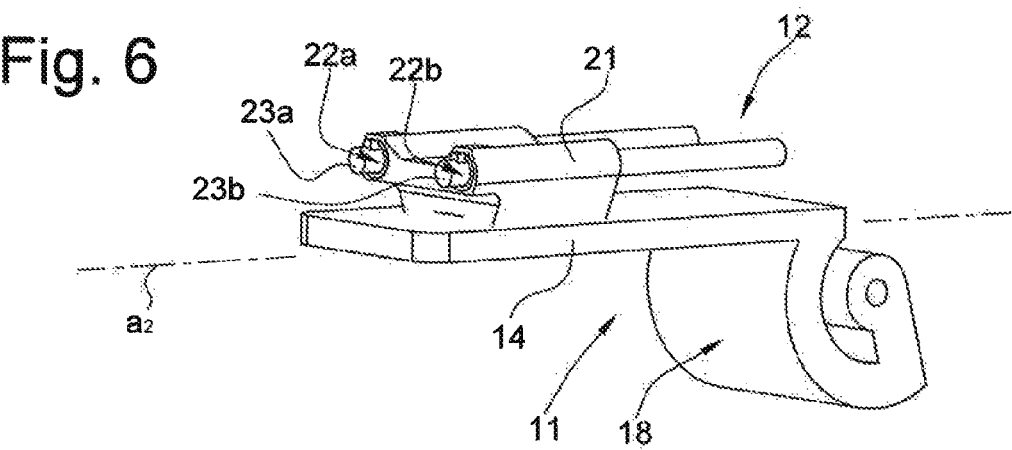
Figure 7:
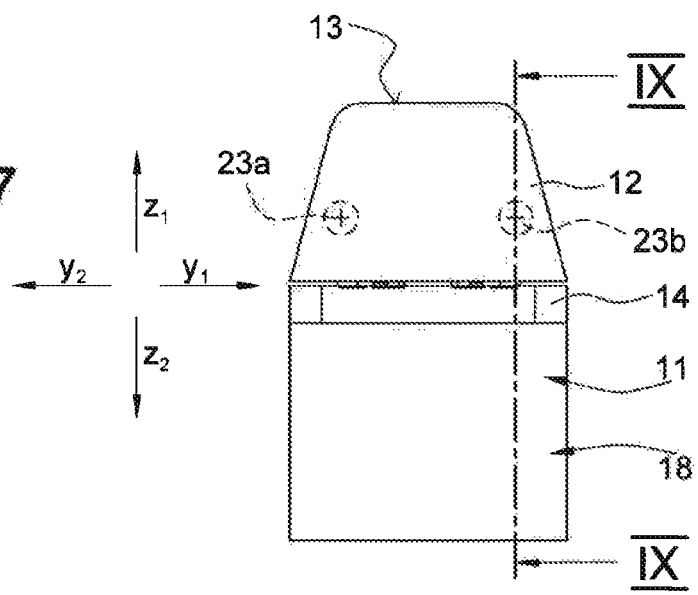
Figure 8:
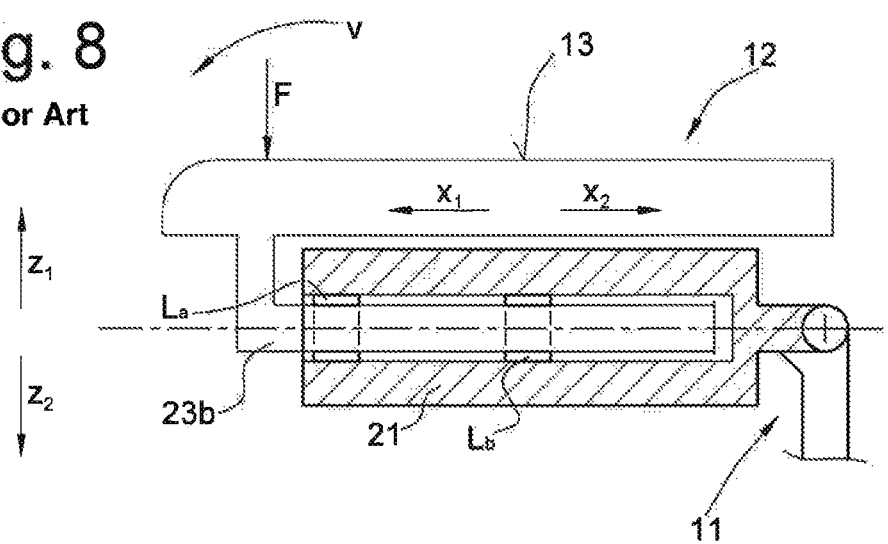
Figure 9:
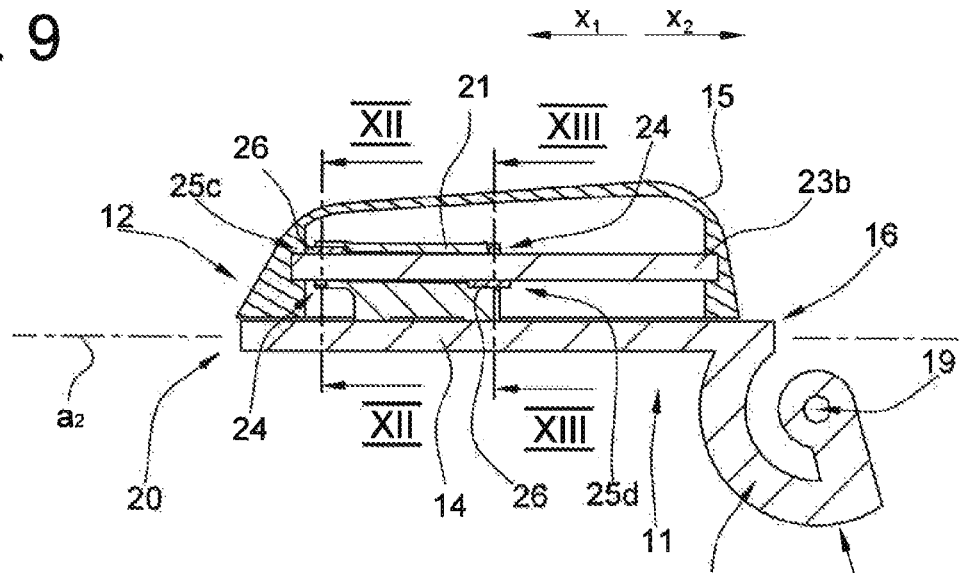
Figure 10:
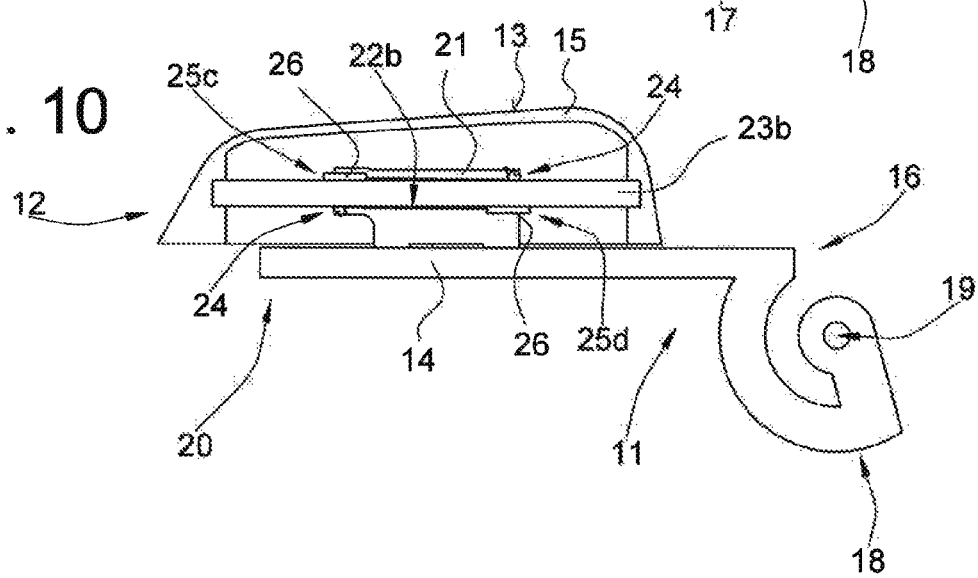
Figure 11:
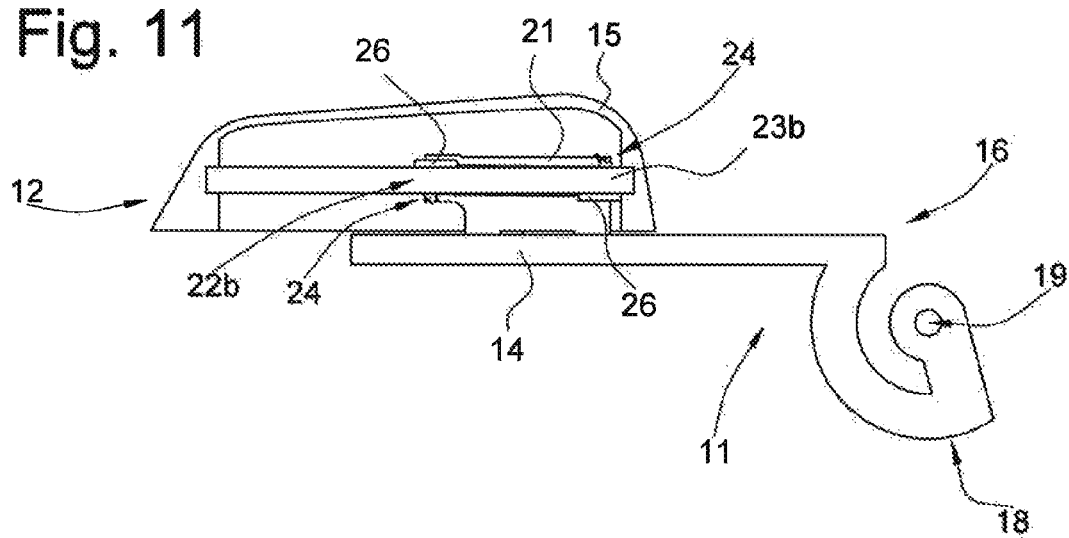
Figure 14:
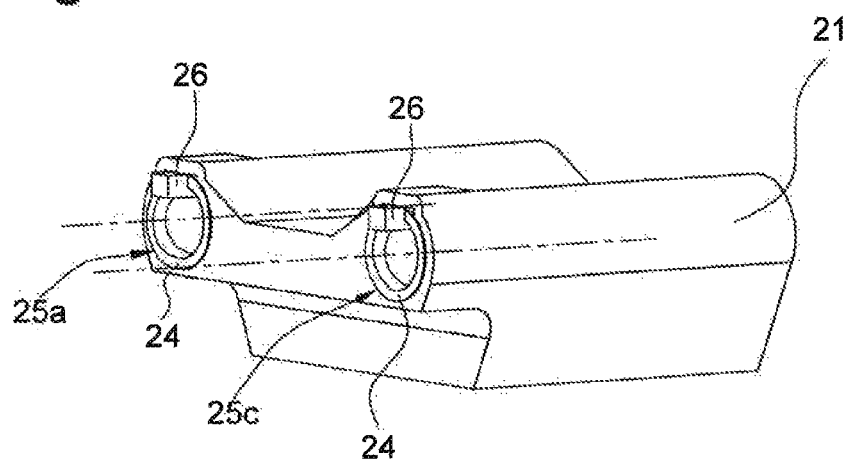
Figure 15:
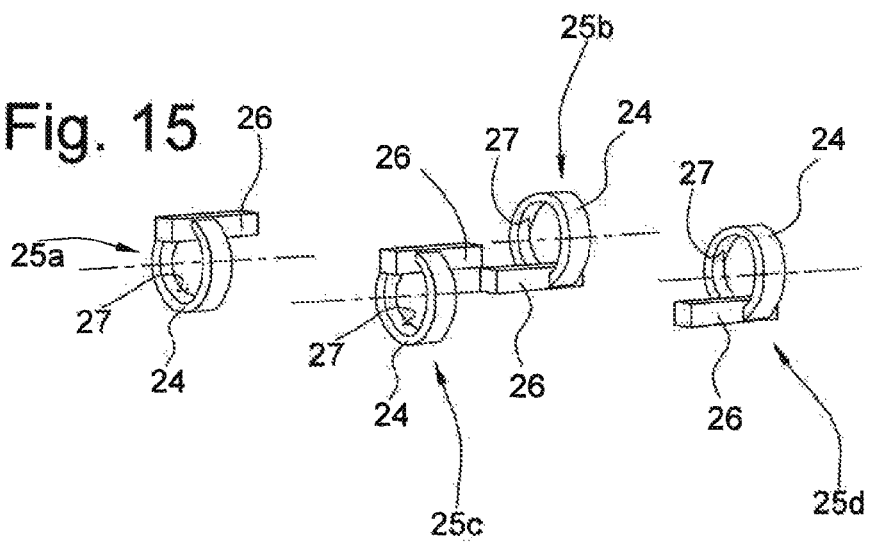
Figure 16:
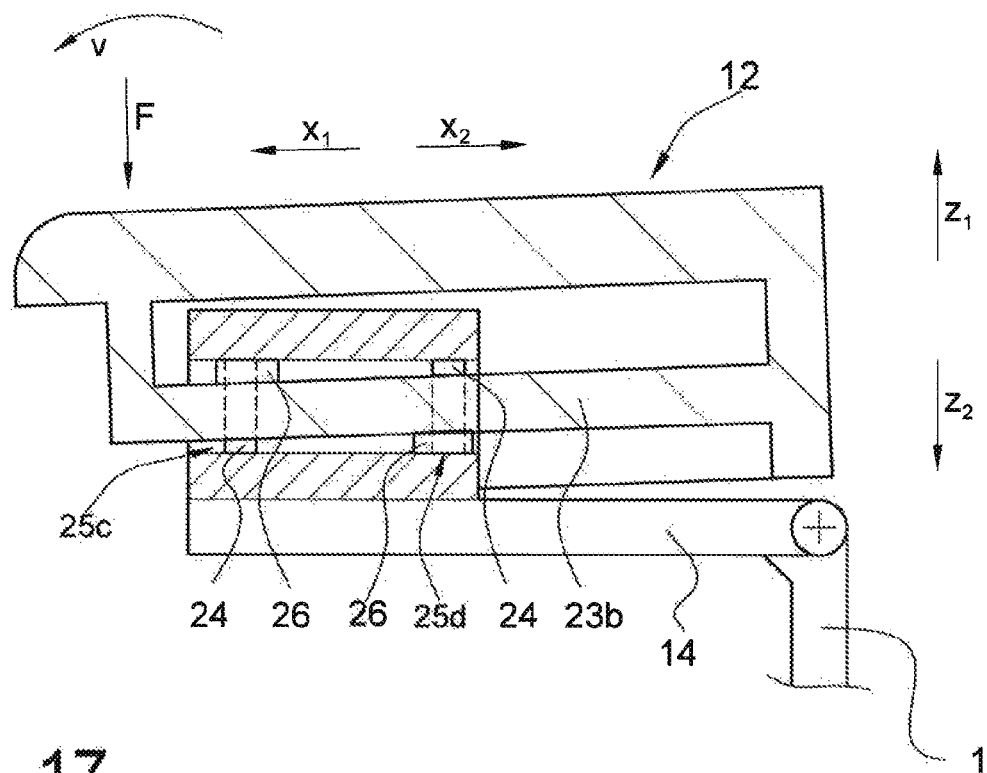
Figure 17:
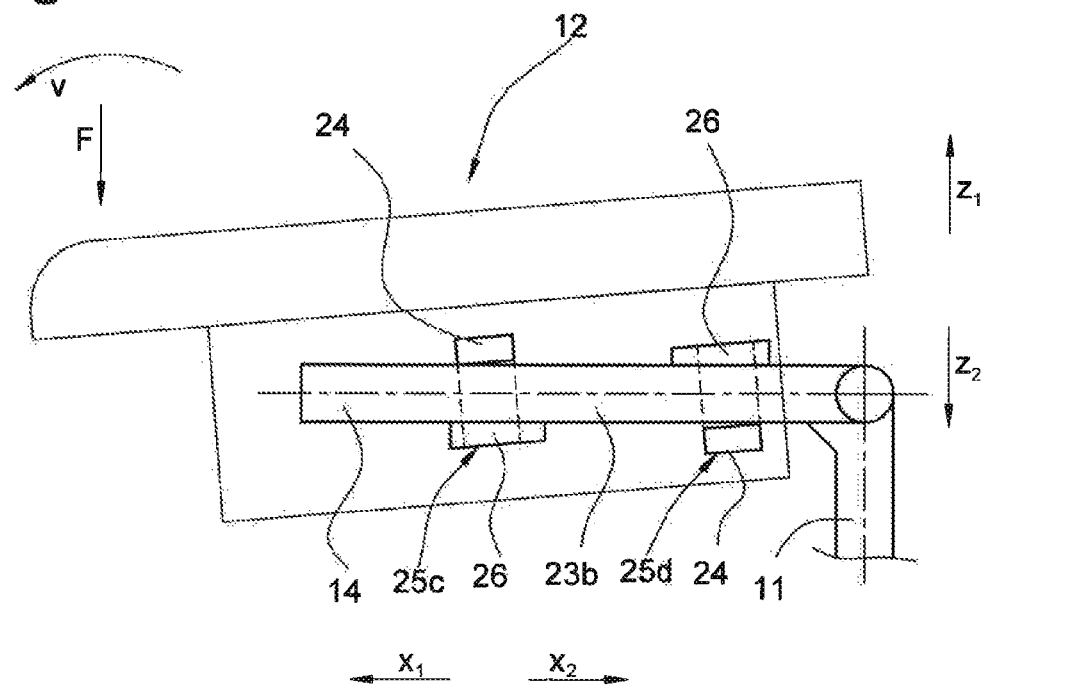

Further advantages of the invention will become apparent from the description of embodiments schematically illustrated in the figures. Therein:

FIG. 1 is a perspective view of an armrest from the front with the arm support of the armrest in a rear position, FIG. 2 shows the armrest as in FIG. 1 with the arm support displaced into a front position, FIG. 3 a side view of the armrest with the arm support in the rear position, FIG. 4 is a side view of the armrest with the arm support in an intermediate position, FIG. 5 a side view of the armrest with the arm support in the front position, FIG. 6 is a perspective view of the armrest from the front as in FIG. 1, but with a housing of the arm support not shown, FIG. 7 is a front view of the armrest according to view arrow VII in FIG. 3, FIG. 8 is a longitudinal section through an armrest from the prior art, FIG. 9 is a longitudinal section of the armrest according to the invention along section line IX-IX in FIG. 7, FIG. 10 shows the armrest as in FIG. 9 but with the arm support in an intermediate position and with no hatching for the sake of clarity, FIG. 11 shows the armrest as in FIG. 9 but with the arm support in the front position and no hatching for the sake of clarity, FIG. 12 is a section according to section line XII-XII in FIG. 9 and with the hatching of the section surfaces not shown for clarity, FIG. 13 is a section according to section line XIII-XIII in FIG. 9 and with the hatching of the section surfaces not shown for clarity, FIG. 14 a perspective detail view of the mount including the bearings from the front, FIG. 15 is a vies like FIG. 14 of the bearings but with the mount 21 not shown, FIG. 16 is a schematic diagram of the armrest according to the first embodiment in longitudinal section, FIG. 17 is a schematic diagram corresponding to FIG. 16 of an alternative embodiment of the armrest in longitudinal section, but with no hatching shown for the sake of clarity.

An armrest as a whole is denoted by the reference numeral 10 in the figures. Like reference numerals in the various figures indicate corresponding parts, even if small letters are adjusted or omitted.

The armrest 10 comprises, according to a first embodiment shown in FIGS. 1 to 7 and 9 to 16, a base 11 and an arm support 12 having a support surface 13. The user can be supported on the support surface 13. The arm support 12 is movable relative to the base 11 in directions $x_1$ and $x_2$. FIGS. 1 and 3 show the arm support 12 in a rear position, FIG. 4 in a middle position and FIGS. 2 and 5 in a front position. The middle position corresponds to an intermediate position. In this way, the position of the arm support 12 can be optimally adapted to the seat occupant.

In the present embodiment, the base 11 is formed from a vehicle-fixed pivot axis $a_1$ and by an arm 14 pivotable about the pivot axis $a_1$ so that the arm support 12 is configured pivotable about the pivot axis $a_1$ in pivot directions $u_1$ and $u_2$. From a position shown in FIG. 3, in which a longitudinal axis $a_2$ of the arm support 12 is approximately horizontal, the arm support can be pivoted in the direction $u_1$ into an unillustrated position in which the longitudinal axis $a_2$ is approximately vertical. This position is indicated in FIG. 4 by a dashed line $a_2$' that is parallel to directions $z_1$ and $z_2$.

A pivot joint may be formed, for example, between a socket, not shown, and the arm 14. A pivot end 16 of the arm 14 forms a projection 17 at a bearing region 18 with openings 19 for engagement of bearings. The arm 14 also has a free end 20.

FIG. 6 shows the armrest 10, but a housing 15 of the arm support 12 is not shown. The arm 14 is fixed to a mount 21 in which two holes 22a and 22b are formed in the shape of elongated bores. The hole 22a receives a rod 23a, and the hole 22b receives a rod 23b. The rods 23a and 23b are fixed on the arm support 12. A longitudinal central axes of the holes 22a and 22b are coaxial with longitudinal center axes of the rods 23a and 23b and parallel to the longitudinal axis $a_2$ of the armrest.

On movement of the arm support 12 in one of the directions $x_1$ or $x_2$, the rods 23a and 23b move in the holes 22a and 22b relative to the mount 21. In the present embodiment, the rods 23a and 23b and the holes 22a and 22b are cylindrical. Alternatively, they can have a different shape.

An armrest from the prior art is shown in FIG. 8. Its arm support 12 is supported in the prior art according to FIG. 8 by two annular bearings La and Lb. They are of an elastically deformable material. When loaded with a force F, they deform until the rods 23a and 23b strike against the outer ends of the holes 22a and 22b. The user of the armrest perceives that as considerable play. Since the center of gravity of the force F lies in front of the bearing La in the direction $x_1$ in the usual load situation, the arm support 12 tilts relative to the mount 21 as part of the play of the rods 23a and 23b in the holes 22a and 22b in direction v.

According to the object of the invention, this play should be eliminated.

As can be seen in FIGS. 9, 12 and 13, the armrest 10 according to the invention has, at the ends of the hole[s 22a and] 22b, seats each provided with a respective annular bearing 24, serving as slide bearings for the rods 23a and 23b. The sections of FIGS. 12 and 13 show a total of four bearing seats 25a, 25b, 25c and 25d formed in the mount 21. The rod 23a is supported by the bearings 24 in the bearing seats 25a and 25b and the rod 23b by the bearings 24 in the seats 25c and 25d. The bearings 24 limit movement of each rod 23a and 23b in a Y-Z plane defined by [horizontal] arrows $y_1$ and $y_2$ and [vertical arrows] $z_1$ and $z_2$.

When the arm support 12 is loaded with a force F corresponding to the main load situation by supporting the arm of a user, the rods 23a and 23b abut against an inner surface 27 of each bearing 24. Due to the tilting of the arm support 12, the rods 23a and 23b abut against a lower surface portion 28 at the bearing seats 25a and 25c (see FIGS. 12 and 13) and against an upper surface portion 29 of the holes 22a and 22b or the bearings 24 at the bearing seats 25b and 25d.

Each bearing 24 is formed, for example, as a closed or open ring and provided with an elastic bumper block 26. The ring is formed, for example, from a relatively stiff plastic. The elastic bumper block 26 is formed only along a limited angular portion of the bearing 24. In this way, the elastic bumper block 26 braces the rods 23a and 23b against the side of the inner surface 27 diametrically opposite the elastic bumper block 26, in particular the inner surface 27 of the ring. As can be seen in FIGS. 12 and 13, the bearings 24 are positioned in the mount 21 such that the rods 23a and 23b are loaded by the elastic bumper block 26 of the bearing points 25a and 25c in the direction $z_2$ and by the elastic bumper block 26 of the bearing points 25b and 25d in the direction $z_1$, which corresponds to the relative position of the rods 23a and 23b to the mount 21 when applying a force F to the arm support 12, in particular to the support surface 13.

Thus, the arm support 12 remains in the same position relative to the mount 21 after removal of the force F. The user cannot detect any play when loading or unloading the arm support 12.

FIG. 14 shows the assembly of the mount 21 and the bearings 24. FIG. 15 shows the bearings 21 in the same arrangement as in FIG. 14, the mount 21 not being shown for the sake of clarity.

The first embodiment is shown again as a schematic diagram in FIG. 16. The elastic bumper blocks 26 brace the rod 23b according to the loading direction by a force F that corresponds to the main load situation by supporting an arm of the user, whereby the arm support is tilted in the direction v. The bearing 24 of the bearing point 25c is loaded in the direction $z_2$ and the bearing 24 of the bearing point 25d in the direction $z_1$.

A schematic diagram of a second embodiment of the armrest 10 is shown in FIG. 16, which only differs from the first embodiment in that the mount 21 is fixed to the arm support 12 and the rods 23a and 23b are fixed to the arm 14. In this case, the rods 23a and 23b are loaded by the elastic bumper blocks 26 of the bearing points 15a and 25c in the direction $z_1$ and by the elastic bumper blocks 26 of the bearing points 15b and 15d in the direction $z_2$ corresponding to the load situation under the action of a force F.

The invention claimed is:

1. An armrest comprising:
a base;
an arm support displaceable linearly relative to the base through intermediate positions between a first position and a second position in opposite displacement directions along a movement path;
a guide assembly comprising a first guide on the base and a second guide on the arm support forming respective guide surfaces movable relative to one another in the displacement directions and limiting movement of the arm support relative to the base transversely to the displacement directions such that there is space between the first guide and the second guide, portions of the guide surfaces of the first and second guides are in contact, one of the first and second guides having a pair of transversely spaced surfaces fixed to the base or to the arm support and through which the other of the first and second guides extends; and
an elastic element in the guide assembly urging the first guide transversely of the displacement directions into contact with the second guide such that contact between the portions is maintained with a transverse force acting perpendicular to the displacement directions on the arm support and on release of the transverse force.

2. An armrest comprising:
a base element;
a support element movable along an axis on the base element between a pair of end positions;
a mount fixed on one of the base and support elements and formed with a hole centered on the axis, extending through the mount, and having an inner surface;
a rod fixed on the other of the base and support elements and extending with radial spacing through the hole of the mount;
a respective inelastic and axially spaced slide-bearing rings fixed in the hole, each having an inner surface projecting radially inward past the inner surface of the hole, and spaced from and surrounding the rod; and
a respective elastic bearing block fixed in and relative to each of the rings and pressing the rod radially and directly against a diametrically opposite portion of the inner surface of the respective ring, the blocks being diametrically opposite each other relative to the axis.

3. An armrest comprising:
a base element;
a support element displaceable forward and backward relative to the base element in a longitudinal direction;
a guide having transversely spaced surfaces fixed on one of the base and support elements and between which the other of the base and support elements extends with transverse clearance; and
an elastic element forming one of the surfaces of the guide and elastically urging the other element transversely into engagement with a counter surface of the guide, the elastic element urging the other element transversely into engagement with the counter surface of the guide such that the contact of the other element and the counter surface is maintained with a transverse force acting perpendicular to the longitudinal direction s on the arm support element and on release of the transverse force.

4. The armrest according to claim 3, wherein the arm support includes a rod on the arm support and the pair of transversely spaced surfaces are on the base or the pair of transversely spaced surfaces are on the arm support and the rod is on the base.

5. The armrest according to claim 4, wherein the rod is cylindrical and the armrest further comprises:
respective front and back rings each forming one surface of the pair of transversely spaced surfaces and carrying the elastic element of the guide assembly.

6. An armrest comprising:
a base element;
a support element displaceable forward and backward relative to the base element in a longitudinal direction;
front and back longitudinally spaced guides having transversely spaced surfaces fixed on one of the base and support elements and between which a rod of the other of the base and support elements extends with transverse clearance; and
respective elastic elements each forming one of the surfaces of each guide and elastically urging the rod transversely into engagement with a counter surface of the respective guide, the elastic elements being on transversely opposite sides of the rod and urging the rod in opposite transverse directions into engagement with the other counter surface of the respective guide such that contact of the other element with the counter surface is maintained with a transverse force acting perpendicular to the longitudinal direction on the o arm support and on release of the transverse force.

* * * * *